US011151307B2

(12) United States Patent
Rastogi et al.

(10) Patent No.: US 11,151,307 B2
(45) Date of Patent: Oct. 19, 2021

(54) MAPPING ANNOTATIONS TO RANGES OF TEXT ACROSS DOCUMENTS

(71) Applicant: ADOBE INC., San Jose, CA (US)

(72) Inventors: Mudit Rastogi, Noida Uttar Pradesh (IN); Prakhar Mehrotra, Kanpur (IN); Souvik Sinha Deb, Noida Uttar Pradesh Pin (IN); Gaurav Tarlok Kakkar, Punjab (IN)

(73) Assignee: Adobe Inc., San Jose, CA (US)

( * ) Notice: Subject to any disclaimer, the term of this patent is extended or adjusted under 35 U.S.C. 154(b) by 123 days.

(21) Appl. No.: 16/189,415

(22) Filed: Nov. 13, 2018

(65) Prior Publication Data
US 2020/0151244 A1    May 14, 2020

(51) Int. Cl.
G06F 40/10     (2020.01)
G06F 40/169    (2020.01)
G06F 40/194    (2020.01)
G06F 40/109    (2020.01)
G06F 40/197    (2020.01)

(52) U.S. Cl.
CPC .......... *G06F 40/169* (2020.01); *G06F 40/109* (2020.01); *G06F 40/194* (2020.01); *G06F 40/197* (2020.01)

(58) Field of Classification Search
CPC .... G06F 40/106; G06F 40/134; G06F 40/166; G06F 40/169; G06F 16/94
See application file for complete search history.

(56) References Cited

U.S. PATENT DOCUMENTS

| 6,125,200 A * | 9/2000 | Warnock | H04N 1/56 382/164 |
| 7,574,675 B1 * | 8/2009 | Linker | G06F 40/166 715/841 |
| 8,346,548 B2 * | 1/2013 | Owen | G06F 16/3343 704/231 |
| 8,943,408 B2 * | 1/2015 | Horns | G06F 40/169 715/711 |
| 9,176,943 B2 * | 11/2015 | Shaver | G06F 40/169 |
| 9,619,481 B2 * | 4/2017 | Biswas | G06F 16/176 |
| 2009/0012777 A1 * | 1/2009 | Ie | G06F 40/194 704/9 |
| 2010/0262659 A1 * | 10/2010 | Christiansen | G06F 16/93 709/205 |
| 2013/0060786 A1 * | 3/2013 | Serrano | G06K 9/3258 707/749 |
| 2013/0117246 A1 * | 5/2013 | Cabaniols | G06F 40/194 707/697 |

(Continued)

*Primary Examiner* — Maikhanh Nguyen
(74) *Attorney, Agent, or Firm* — Shook, Hardy & Bacon L.L.P.

(57) ABSTRACT

An annotation corresponding to a first range of text of a first document may be received. Based on the annotation, comparisons may be performed between a text string that comprises the first range of text and a group of text of a second document at different positions in the group of text. Based on the comparisons, similarity scores between the text string and the group of text may be determined at the different positions in the group of text. A position for the annotation in the group of text may be selected based on the similarity scores at the different positions. The annotation may be associated with a second range of text in the group of text that corresponds to the position.

20 Claims, 10 Drawing Sheets

(56) References Cited

U.S. PATENT DOCUMENTS

| | | | |
|---|---|---|---|
| 2013/0124978 A1* | 5/2013 | Horns | G06F 40/169 |
| | | | 715/243 |
| 2013/0124983 A1* | 5/2013 | Hausig | G06F 40/103 |
| | | | 715/249 |
| 2013/0246048 A1* | 9/2013 | Nagase | G06F 40/129 |
| | | | 704/9 |
| 2013/0254216 A1* | 9/2013 | Yamamoto | G06F 16/3334 |
| | | | 707/749 |
| 2014/0013209 A1* | 1/2014 | Good | G06F 40/154 |
| | | | 715/235 |
| 2014/0033015 A1* | 1/2014 | Shaver | G06F 40/169 |
| | | | 715/233 |
| 2015/0220504 A1* | 8/2015 | Bocanegra Alvarez | G06F 40/169 |
| | | | 715/233 |
| 2015/0363405 A1* | 12/2015 | Biswas | G06F 16/176 |
| | | | 707/723 |

* cited by examiner

FIG. 1B

Document - 102

114

This is sample Text.
This is to show an
example of the algorithm.

In this exple, the word
that was supposed to be
highlighted has been
changed after the copy of
the document was
created also new font.

The correct word is
identified despite the
change.

Copy of Document (Annotated) - 104

114

This is sample Text.
This is to show an
example of the algorithm.

120

In this exple the word
that was supposed to be
highlighted has been
changed after the copy of
the document was
created also new font.

The correct word is
identified despite the
change.

134A  132  134B

130: In this exple the word that

Modified Document (w/Annotations) – 102B

114A

This is sample Text. This
is to show an example of
the algorithm.

120A

120B

This is new text. In this
example the word that
was supposed to be
highlighted has been
changed after the copy of
the document was created
also new font.

The correct word is
identified despite the
change.

136: example

| | | j | e | v | e | r | y | o | n | e |
|---|---|---|---|---|---|---|---|---|---|---|
| | i | | 0 | 1 | 2 | 3 | 4 | 5 | 6 | 7 | 8 |
| 0 | | 0 | 1 | 2 | 3 | 4 | 5 | 6 | 7 | 8 |
| 1 | H | 0 | 1 | 2 | 3 | 4 | 5 | 6 | 7 | 8 |
| 2 | e | 0 | 0 | 1 | 2 | 3 | 4 | 5 | 6 | 7 |
| 3 | l | 0 | 1 | 1 | 2 | 3 | 4 | 5 | 6 | 7 |
| 4 | l | 0 | 1 | 2 | 2 | 3 | 4 | 5 | 6 | 7 |
| 5 | o | 0 | 1 | 2 | 3 | 3 | 4 | 4 | 5 | 6 |
| 6 | | 0 | 1 | 2 | 3 | 4 | 4 | 5 | 5 | 6 |
| 7 | e | 0 | 0 | 1 | 2 | 3 | 4 | 5 | 6 | 5 |
| 8 | v | 0 | 1 | 0 | 1 | 2 | 3 | 4 | 5 | 6 |
| 9 | e | 0 | 0 | 1 | 0 | 1 | 2 | 3 | 4 | 5 |
| 10 | r | 0 | 1 | 1 | 1 | 0 | 1 | 2 | 3 | 4 |
| 11 | y | 0 | 1 | 2 | 2 | 1 | 0 | 1 | 2 | 3 |
| 12 | o | 0 | 1 | 2 | 3 | 2 | 1 | 0 | 1 | 2 |
| 13 | n | 0 | 1 | 2 | 3 | 3 | 2 | 1 | 0 | 1 |
| 14 | e | 0 | 0 | 1 | 2 | 3 | 3 | 2 | 1 | 0 |
| 15 | | 0 | 1 | 1 | 2 | 3 | 4 | 3 | 2 | 1 |
| 16 | w | 0 | 1 | 2 | 2 | 3 | 4 | 4 | 3 | 2 |
| 17 | e | 0 | 0 | 1 | 2 | 3 | 4 | 5 | 4 | 3 |
| 18 | l | 0 | 1 | 1 | 2 | 3 | 4 | 5 | 5 | 4 |
| 19 | c | 0 | 1 | 2 | 2 | 3 | 4 | 5 | 6 | 5 |
| 20 | o | 0 | 1 | 2 | 3 | 3 | 4 | 4 | 5 | 6 |
| 21 | m | 0 | 1 | 2 | 3 | 4 | 4 | 5 | 5 | 6 |
| 22 | e | 0 | 0 | 1 | 2 | 3 | 4 | 5 | 6 | 5 |

Group of Text 414

Text String 412

| | | 0 | 1 | 2 | 3 | 4 | 5 | 6 | 7 |
|---|---|---|---|---|---|---|---|---|---|
| 22 | e | 0 | 0 | 1 | 2 | 3 | 4 | 5 | 4 |
| 21 | m | 0 | 1 | 2 | 3 | 4 | 4 | 4 | 5 |
| 20 | o | 0 | 1 | 2 | 3 | 3 | 3 | 4 | 5 |
| 19 | c | 0 | 1 | 2 | 2 | 3 | 4 | 5 | 6 |
| 18 | l | 0 | 1 | 1 | 2 | 3 | 4 | 5 | 5 |
| 17 | e | 0 | 0 | 1 | 2 | 3 | 4 | 5 | 4 |
| 16 | w | 0 | 1 | 2 | 2 | 3 | 4 | 4 | 3 |
| 15 |   | 0 | 1 | 1 | 2 | 3 | 4 | 3 | 2 |
| 14 | e | 0 | 0 | 1 | 2 | 3 | 3 | 2 | 1 |
| 13 | n | 0 | 1 | 2 | 3 | 3 | 2 | 1 | 2 |
| 12 | o | 0 | 1 | 2 | 3 | 2 | 1 | 2 | 3 |
| 11 | y | 0 | 1 | 2 | 2 | 1 | 2 | 3 | 4 |
| 10 | r | 0 | 1 | 1 | 1 | 1 | 2 | 3 | 4 |
| 9 | e | 0 | 0 | 1 | 0 | 1 | 2 | 3 | 4 |
| 8 | v | 0 | 1 | 0 | 1 | 2 | 3 | 4 | 5 |
| 7 | e | 0 | 0 | 1 | 2 | 3 | 4 | 5 | 4 |
| 6 |   | 0 | 1 | 2 | 3 | 4 | 4 | 4 | 5 |
| 5 | o | 0 | 1 | 2 | 3 | 3 | 3 | 4 | 5 |
| 4 | l | 0 | 1 | 2 | 2 | 3 | 4 | 5 | 6 |
| 3 | l | 0 | 1 | 1 | 2 | 3 | 4 | 5 | 6 |
| 2 | e | 0 | 0 | 1 | 2 | 3 | 4 | 5 | 6 |
| 1 | H | 0 | 1 | 2 | 3 | 4 | 5 | 6 | 7 |
| 0 |   | 0 | 1 | 2 | 3 | 4 | 5 | 6 | 7 |
| i |   | e | v | e | r | o | n | e |
|   | j | 0 | 1 | 2 | 3 | 4 | 5 | 6 | 7 |

Group of Text 424

Text String 422

*FIG. 4B*

MAPPING ANNOTATIONS TO RANGES OF TEXT ACROSS DOCUMENTS

BACKGROUND

Various applications enable users to author documents of text using word processing functionality. Examples include InDesign®, Dreamweaver®, and Illustrator® by Adobe®. Other users may review a document using the same or a different application. The users may receive a copy of the document from the author, open the copy in an application, and use the application to annotate any number of portions of the document. To do so, a user may select a range of text from a larger group of text of a document to apply an annotation to the range of text. Examples of the annotation include a highlight, a strikethrough, a comment, or an underline. After a copy of a document is annotated, the annotated copy may be returned to the author or another user tasked with evaluating the annotations and updating the document accordingly.

A user may evaluate an annotation by importing the annotation into the user's document, such as the original document provided for review. In a conventional approach, an annotation to a copy of a document is a drawing that includes a position and dimensions without explicitly capturing text associated with the annotation. The annotation imported from the copy is presented in another document at the position and with the dimensions specified by the copy of the document. However, the text of the document that the annotation is imported into may not match the text of the copy. For example, an author may move and/or modify one or more portions of the text of the original document after the copy is produced, such as to correct spelling mistakes, change fonts, etc. Due to the changes to the text, the position and/or dimensions of the imported annotation may no longer indicate text to which the annotation pertains, resulting in erroneous portions of the screen being annotated.

SUMMARY

Embodiments of the present disclosure relate to mapping annotations to ranges of text across documents. Systems and methods are disclosed related to approaches to importing annotations made to one document into another document, such that the annotations are mapped to ranges of text that are relevant to the annotations.

In implementations, a request is received to import an annotation corresponding to a range of text from a source document (e.g., of a copy of a document) into a destination document (e.g., an original document). A text string is generated that includes the range of text and, in some cases, contextual characters that surround the range of text corresponding to the annotation. A target group of text for the annotation may be identified in the destination document based on a comparison between a location of the target group of text in the destination document to a location of the range of text in the source document. The text string is compared to the target group of text at different positions in the target group of text to determine similarity scores between the text string and the target of text at the different positions in the target group of text. A position for the annotation in the target group of text may be selected based on the similarity scores at the different positions and the annotation may be associated with a range of text in the target group of text that corresponds to the position. Using this approach, the associated range of text is likely to indicate text to which the annotation pertains, even in cases where text of the destination document is modified after the source document was made as a copy of the destination document.

In further respects, the annotation may be received from the destination document as a graphical object(s), such as a drawing made over text of the destination document. To extracted the range of text from the destination document for the text string, text is identified based on determining the text intersects the graphical object(s) of the annotation. Characters of the identified text are analyzed to determine an extent that the graphical object(s) overlap the characters, and each character may be included in the extracted range of text based on the extent of overlap for the character satisfying at least one condition. The at least one condition may be, for example, that a centroid of the character is within the graphical object(s). Using this approach, the extracted range of text is likely to only include the characters that were intended for the annotation when it originally made to the destination document.

BRIEF DESCRIPTION OF THE DRAWINGS

The present invention is described in detail below with reference to the attached drawing figures, wherein:

FIG. 1B depicts groups of text that may be involved in an example of mapping annotations to ranges of text across documents, in accordance with some embodiments of the present disclosure;

FIG. 4A illustrates an example of a table of similarity scores, in accordance with some embodiments of the present disclosure;

FIG. 4B illustrates an example of a table of similarity scores, in accordance with some embodiments of the present disclosure;

DETAILED DESCRIPTION

Figure 1A:
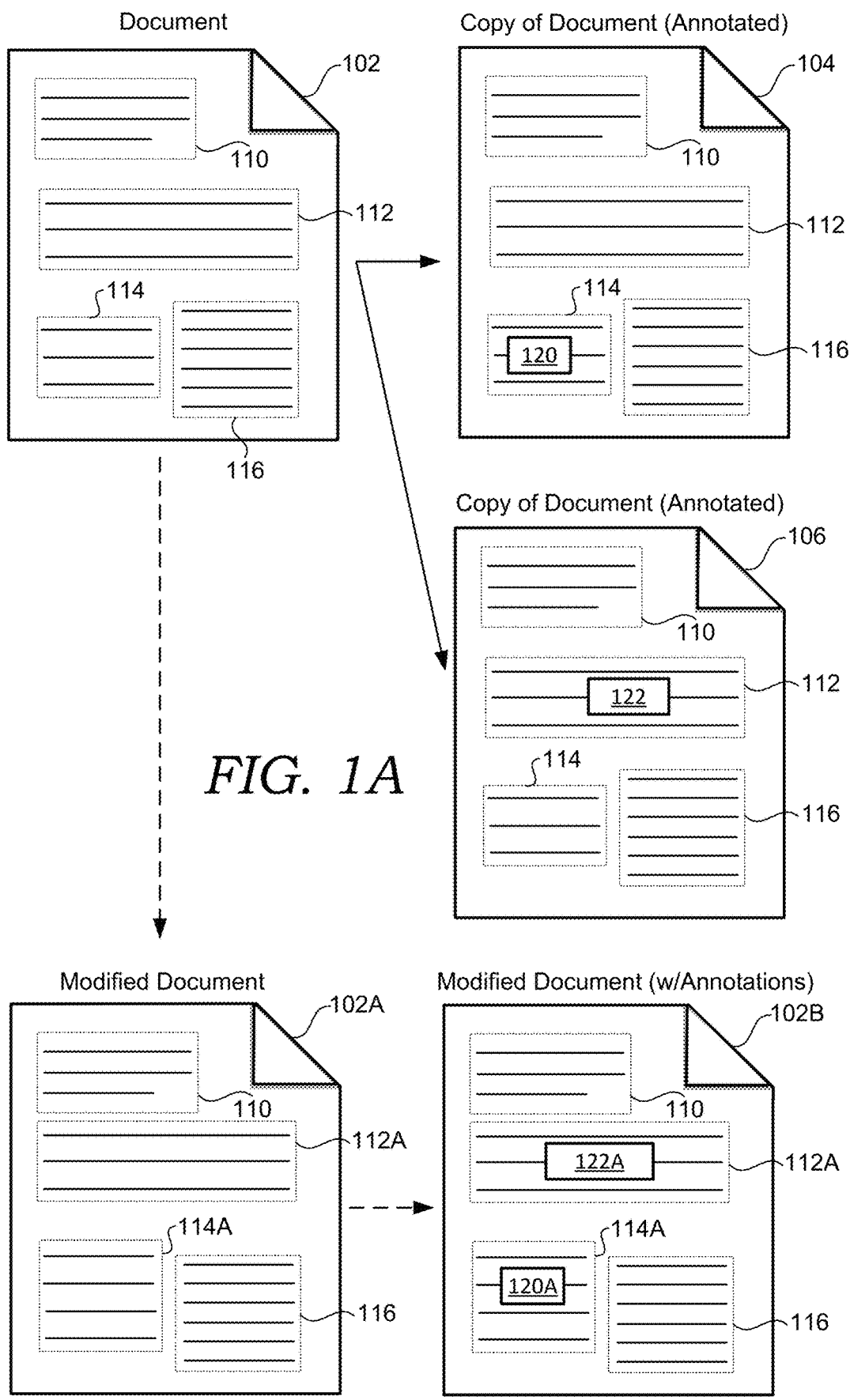
FIG. 1A depicts an example of mapping annotations to ranges of text across documents, in accordance with some embodiments of the present disclosure.

Upon receiving a copy of a document, a user may open the copy in an application, and use the application to annotate any number of portions of the document for review purposes. To do so, the user may select a range of text from a larger group of text to apply an annotation to the range of text. Examples of the annotation include a highlight, a strikethrough, a comment, or an underline.

Annotations from other users may be evaluated by importing annotations made to document copies into one document, such as an original document provided for review. However, the original document may have been modified after at least some of the copies of the document were made for review. In such cases, conventional approaches to importing an annotation into a document are often unable to indicate text in the document that is relevant to a range of text that was annotated in a copy of the document.

For example, in a conventional approach, an annotation to a source document is a drawing that includes a position and dimensions without explicitly capturing the text that was selected to generate the annotation. The annotation imported from the source document is presented in a destination document at the position and with the dimensions specified by the source document. If content of the destination document does not match content of the source document, the position and/or dimensions of the imported annotation may no longer indicate text to which the annotation pertains, resulting in erroneous portions of the screen/document being annotated.

Aspects of the present disclosure provide approaches to mapping annotations between groups of text. The approaches can account for differences in the groups of text, such as differences in the characters of text, formatting of the text, and/or positions of the text within documents or more generally larger groups of text. Generally, to account for the differences, it is first determined what range of text was annotated in a source group of text. The range of text is compared to a target group of text at different positions in the target group of text to determine how similar the range of text is to the target group of text at the different positions. The most similar position may be associated with the annotation. Using approaches described herein, the position and/or dimensions of an imported annotation may reliably indicate text to which the annotation pertains, even if content of a document receiving the imported annotation does not match content of the annotated document.

In some implementations, an annotation is made to a range of text of a source group of text, such as a source group of text of a source document. To import the annotation into a target group of text, such as a target group of text of a destination document, a text string that includes the range of text is determined based on the annotation. The text string is compared to the target group of text at different positions in the target group of text. Based on the comparisons, similarity scores between the text string and the target group of text are determined at the different positions. A position for the annotation in the target group of text may be selected based at least in part on the similarity scores at the different positions. A range of text in the target group of text that corresponds to the selected position may be associated with the annotation.

The text string associated with the annotation may include at least some contextual characters based on the range of text that was annotated in the source group of text. For example, contextual characters may be included in the range of text based on proximities of the characters to the range of text in the source group of text. Using contextual characters may allow for an imported annotation to be associated with a range of text in a target group of text that is highly relevant to the range of text that was annotated, even where the target group of text includes other similar or identical text.

In some embodiments, the annotation being imported may comprise a graphical object(s), such as a drawing made over text of a source document. The dimensions and position of graphical object(s) may overlap with the range of text that was selected to be annotated, and also overlap some additional text near the range of text. Approaches described herein allow for the range of text to be reliably extracted from a source group of text and associated with an annotation without including the text near the range of text. In some cases, text is identified based on determining the text that intersects the graphical object(s) of the annotation. Characters of the identified text are analyzed to determine an extent that the graphical object(s) overlap the characters, and each character may be included in the extracted range of text based on the extent of overlap satisfying at least one condition. The at least one condition may be, for example, that a centroid of the character is within the graphical object(s).

A target group of text of a destination document (or larger group of text) is selected for comparison with a text string to attempt to import an annotation into the target group of text. The target group of text may be identified based on a comparison between a location of the target group of text (e.g., in the destination document) to a location of the range of text (e.g., in the source document). For example, multiple groups of text may be available and the target group of text having the most similar location to the range of text may be selected for comparison with the text string (e.g., at least initially). In some embodiments, if no group of text falls within a threshold distance of the range of text of the source document, no target group of text may be selected for importing the annotation. This may save processing power in cases where the destination document is significantly different than the source document (or more generally destination group(s) of text and source group(s) of text).

Referring now to FIG. 1A, an example of mapping annotations to ranges of text across documents is depicted, in accordance with some embodiments of the present disclosure. FIG. 1A illustrates a number of digital documents including a document 102, a document copy 104, a document copy 106, a modified document 102A, and an annotated modified document 102B.

A user may have authored text of the document 102 using one or more applications that have word processing functionality, such as InDesign, Dreamweaver, or Illustrator by Adobe. The document 102 may be a file and/or data object stored in a format compatible with one or more of those applications. The document 102 includes text and may also include other visual elements, such as images, videos, charts, drawings, and the like. For example, the text may be included at least partially in one or more groups of text, of which text groups 110, 112, 114, and 116 are shown. In some embodiments, a text group may correspond to a text frame, such as an InDesign text frame. A text frame may refer to a drawing primitive that defines an area in a document to contain textual information. A text frame may include a resizable rectangular area that can include multiple lines of text that may be provided using word processing functions. A text area of a text frame may automatically wrap and clip text or otherwise confine the text within the bounds of the frame.

FIG. 1B depicts groups of text (e.g., within text frames) that may be involved in an example of mapping annotations to ranges of text across documents, in accordance with some embodiments of the present disclosure. As shown, by way of example, the text group 114 includes one or more text strings. One or more characters of the text strings may be associated with one or more formatting options, such as a font size, a font, a text alignment, a highlight, an underline, a strikethrough, an italic format, a bold format, a subscript format, and/or a superscript format. Further, one or more of the formatting options may be stored as metadata for the text and used to display the text in an application.

Returning to FIG. 1A, the document copy 104 and the document copy 106 are copies of the document 102 that have been annotated. For example, the file and/or data object of the document 102 may be copied and distributed to one or more other users. As another example, a new file and/or data object may be created that is a reformatted version of the file and/or data object (e.g., a file having a different file format that is exported from an application). The document copy 104 and the document copy 106 may include substantially the same visual content as the document 102. For example, the document copy 104 and the document copy 106 each include the text groups 110, 112, 114, and 116. In some cases, one or more of the document copy 104 or the document copy 106 may not include one or more format options as metadata. However, text from the document 102 may be rendered using the formatting option(s), and the rendered text may be included in the copy of the document.

Users may open the document copy 104 and the document copy 106 independently (e.g., using different user devices), such as to review the content of the document 102, using any suitable application(s) to specify one or more annotations. For example, FIG. 1B shows an annotation 120 made by a user to the text group 114 of the document copy 104. In some embodiments, the annotation may be made by a user providing user input to an annotation tool of an application that displays the document copy 104. A different annotation tool may be user selectable to generate different types of annotations (e.g., strikethrough, underline, etc.). In some cases, the annotation tool may comprise a graphic user interface (GUI) element used to create a drawing over existing content of the document copy 104, which may comprise one or more geometric objects (e.g., quadrilaterals). For example, the annotation 120 may comprise a graphical object having various metadata. Additionally, or alternatively, the annotation 120 may comprise formatting options as described above, such as for a range of text. As examples, metadata of an annotation may include dimensional information such as a width and a height that define how to draw the graphical object, and positional information, such as coordinates that define where to draw the graphical object in presenting the document, a drawing primitive type, and/or color information. An annotation may include for example, a highlight, an underline, a strikethrough, an italic format, a bold format, a subscript format, a text replace, a text insert, a text delete, a comment, and/or a superscript format.

In some embodiments, a user provides user input to generate an annotation, where the user input includes a selection of a range of text in the document copy 104 from the group of text 114 (e.g., using an annotation tool). In the example of the annotation 120, the user has selected the range of text "exple" for the annotation 120, and the annotation 120 may be drawn based on the selection. The annotation 120 may be saved as metadata of the document copy 104, which may not explicitly indicate the range of text that the user selected for the annotation 120. For example, the annotation 120 may comprise a graphical object having dimensional and positional information (visual information). As another example, the annotation 120 may have been generated with an explicit indication of the range of text, which was later lost by subsequent document conversion, printing, etc.

The document copy 106 may be annotated similar to the document copy 104, and each may include different annotations. For example, the document copy 106 includes an annotation 122 that is not included in the document copy 104, and the document copy 106 does not include the annotation 120.

The modified document 102A may correspond to the document 102 modified after creation of the document copy 104 and the document copy 106. For example, the user may have edited or otherwise modified the document 102 to generate the modified document 102A, which may correspond to a same or different file and/or data object as the document 102. In some cases, the author of the document 102 may be in the same file and/or data object format as the document 102. By way of example, the modified document 102A is substantially similar to the document 102 and includes the text groups 110 and 116. While the present examples describe the modified document 102A, it is noted that embodiments of the present disclosure may be used to import annotations into the document 102, or more generally any group of text or document.

As shown in FIG. 1A., the modified document 102A may include a text group 112A, which includes the same content as the text group 112, and the text group 114A, which includes modified content from the text group 114. For example, the text group 112A is provided as an example of a user moving the text group 112 of the document 102 such that the text group 112A is displayed at a different location in the modified document 102A. The text group 114A is provided as an example of a user modifying content of the text group 114 of the document 102 such that the text group 114A includes at least some different text than the text group 114. For example, as shown in FIG. 1B, for the text group 114A, a user has added new text to the text group 114. Further, the user has modified the "exple" text to correct a spelling mistake. Also, the user has modified the font of the text group 114. In this example, a majority of sentences, paragraphs, and/or words remain from the text group 114.

A user may wish to import at least one annotation made to a copy of the document 102 into the modified document 102A to generate an annotated modified document 102B. For example, any number of annotations may be aggregated from any number of document copies into the modified document 102A, such that the user can view each of the annotations in the annotated modified document 102B. It may be desirable to associate a range of text 132 of the modified document 102A with an annotation being imported, such as to indicate to the user the text to which the annotation pertains. However, any of the various changes made to the document 102 that resulted in the modified document 102A can prevent conventional approaches from indicating text of the annotated modified document 102B that corresponds to the range of text 132 that was annotated in the imported document copy. For example, a conventional approach to importing the annotation 120 may display an annotation 120B in the annotated modified document 102B that is in the same position and has the same dimensions as the annotation 120 made to the document copy 104. However, the annotation 120B does not indicate text of the annotated modified document 102B that corresponds to the range of text 132 (e.g., "exple") that was annotated in the document copy 104.

In accordance with various embodiments of the present disclosure, the annotation 120 may be mapped to a range of text 136 (e.g., "example") that corresponds to the range of text 132 (e.g., "exple") annotated in the document copy 104. The annotation 120A may then be displayed at a position and/or with dimensions that are based on the range of text 136 to indicate the range of text 136 is associated with the annotation 120A.

In some embodiments, to import the annotation 120 into the modified document 102A to provide the annotated modified document 102B, a text string 130 is generated from the text group 114 of the document copy 104 that includes the range of text 132 (e.g., "exple") and optionally contextual characters 134A and/or 134B that surround the range of text 132 in the document copy 104 (e.g., "In this" and/or "the word that"). For example, the text string 130 could be "In this exple the word that," depending upon the number of words and/or characters that are to be included in addition to the range of text 132. The text group 114A of the modified document 102A may optionally be identified based on a comparison between a location of the text group 114A in the modified document 102A to a location of the range of text 132 (and/or of the annotation 120, the text group 114, or the text string 130) in the document copy 104. The text string 130 may be compared to the text group 114A from the modified document 102A at different positions in the text group 114A to determine similarity scores between the text string 130 and the text group 114A at the different positions in the text group 114A. Examples of similarity scores will later be described with respect to FIGS. 4A and 4B.

A position for the annotation 120A in the text group 114A may be selected based on the similarity scores at the different positions and the annotation 120A may be associated with a range of text in the text group 114A that corresponds to the position. Using this approach, the associated range of text 136 (e.g., "example") is likely to indicate text to which the annotation pertains, even where text of the document (e.g., "exple") was modified after the document copy 104 was made.

Figure 2A:
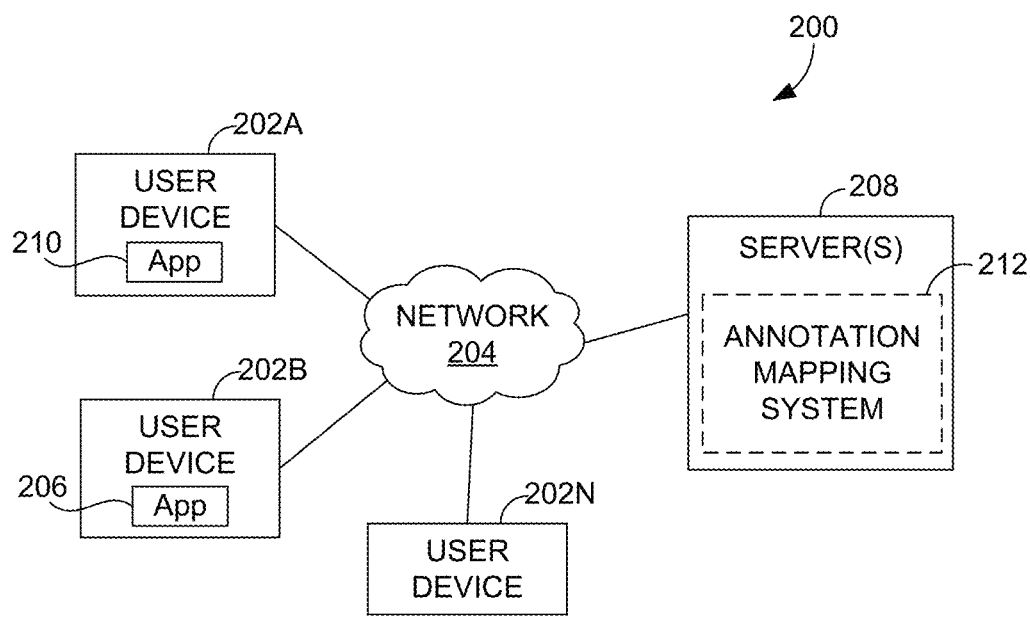
FIG. 2A is a block diagram showing an example of an operating environment, in accordance with embodiments of the present disclosure.

Turning now to FIG. 2A, a block diagram is provided showing an example of an operating environment in which some implementations of the present disclosure can be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, an operating environment 200 includes a number of user devices, such as user devices 202A and 202B through 202N, a network 204, and server(s) 208. It should be understood that the operating environment 200 shown in FIG. 2A is an example of one suitable operating environment. Each of the components shown in FIG. 2A may be implemented via any type of computing device, such as one or more of computing device 700 described in connection to FIG. 7, for example. These components may communicate with each other via the network 204, which may be wired, wireless, or both. The network 204 can include multiple networks, or a network of networks, but is shown in simple form so as not to obscure aspects of the present disclosure. By way of example, the network 204 can include one or more wide area networks (WANs), one or more local area networks (LANs), one or more public networks such as the Internet, and/or one or more private networks. Where the network 204 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, the network 204 is not described in significant detail.

It should be understood that any number of user devices, servers, and other disclosed components may be employed within the operating environment 200 within the scope of the present disclosure. Each may comprise a single device or multiple devices cooperating in a distributed environment.

The user devices 202A through 202N comprise any type of computing device capable of being operated by a user. For example, in some implementations, the user devices 202A through 202N are the type of computing device described in relation to FIG. 7 herein. By way of example and not limitation, a user device may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user devices can include one or more processors, and one or more computer-readable media. The computer-readable media may include computer-readable instructions executable by the one or more processors. The instructions may be embodied by one or more applications, such as an application 210 shown in FIG. 2A. The application 210 is referred to as a single application for simplicity, but its functionality can be embodied by one or more applications in practice. The other user devices can include one or more applications similar to the application 210. For example, the application 206 may be the same or a different application than the application 210.

The application(s) may generally be any application capable of facilitating the exchange of information between the user devices and the server(s) 208 in carrying out aspects of the present disclosure. In some implementations, the application(s) comprises a web application, which can run in a web browser, and could be hosted at least partially on the server-side of the operating environment 200. In addition, or instead, the application(s) can comprise a dedicated application, such as document editing software, examples of which include InDesign, Dreamweaver, Illustrator, or Acrobat® by Adobe, and the like. In some cases, one or more applications represented by the application 210 or the application 206 is integrated into the operating system (e.g., as a service). It is therefore contemplated herein that "application" be interpreted broadly.

In some embodiments, the application 210 and/or the application 206 may be the application(s) referred to with respect to FIGS. 1A and 1B. For example, the application 210 may, via user input, provide text to the document 102 and/or create one or more of the document copy 104 or the document copy 106. Further the application 210 may, via user input, alter some of the text of the document 102 to produce the modified document 102A. The application 206, may via user input, provide the annotations 120 and/or 122 to the document copy 104 and/or the document copy 106. Further, the application 210 may import the annotations 120 and/or 122 into the modified document 102A to produce the annotated modified document 102B.

The server(s) 208 also includes one or more processors, and one or more computer-readable media. The computer-readable media includes computer-readable instructions executable by the one or more processors. The instructions may optionally implement one or more components of an annotation mapping system 212, described in additional detail below. However, the components may generally be implemented on any combination of the server(s) 208, the user devices 202A, and/or the application(s) 210, 206. Additionally, other components not shown may also be included within the distributed environment.

Thus, it should be appreciated that the annotation mapping system 212 may be provided via multiple devices arranged in a distributed environment that collectively provide the functionality described herein, or may be embodied on a single device or combination thereof. In some cases, the annotation mapping system 212 can be integrated, at least partially, into a user device, such as the user device 202A. Furthermore, the annotation mapping system 212 may at least partially be embodied as a cloud computing service.

For cloud-based implementations, the instructions on the server 208 may implement one or more components of the annotation mapping system 212, and the application 210 or the application 206 may be utilized by a user to interface with the functionality implemented on the server(s) 208. As mentioned above, in some cases, the application 210 and/or the application 206 comprises a web browser. In other cases, the server 208 may not be required. For example, the components of the annotation mapping system 212 may be implemented completely on a user device, such as the user device 202A. Thus, the annotation mapping system 212 may be embodied at least partially by the instructions corresponding to the application 210 and/or the application 206.

The annotation mapping system 212 can perform various functions involved in mapping an annotation to a range of text. For example, the annotation mapping system 212 may generate and/or determine a text string for an annotation to be mapped to a group of text. The annotation mapping system 212 may compare the text string to the group of text at different positions in the group of text to determine similarity scores between the text string and the group of text at the different positions. The annotation mapping system 212 may also select a position for the annotation in the group of text based on the similarity scores and associate the annotation with a range of text in the group of text that corresponds to the position. Using this approach, the associated range of text is likely to indicate text to which the annotation pertains, even where the group of text does not include text that is identical to the text to which the annotation was originally made.

Figure 2B:
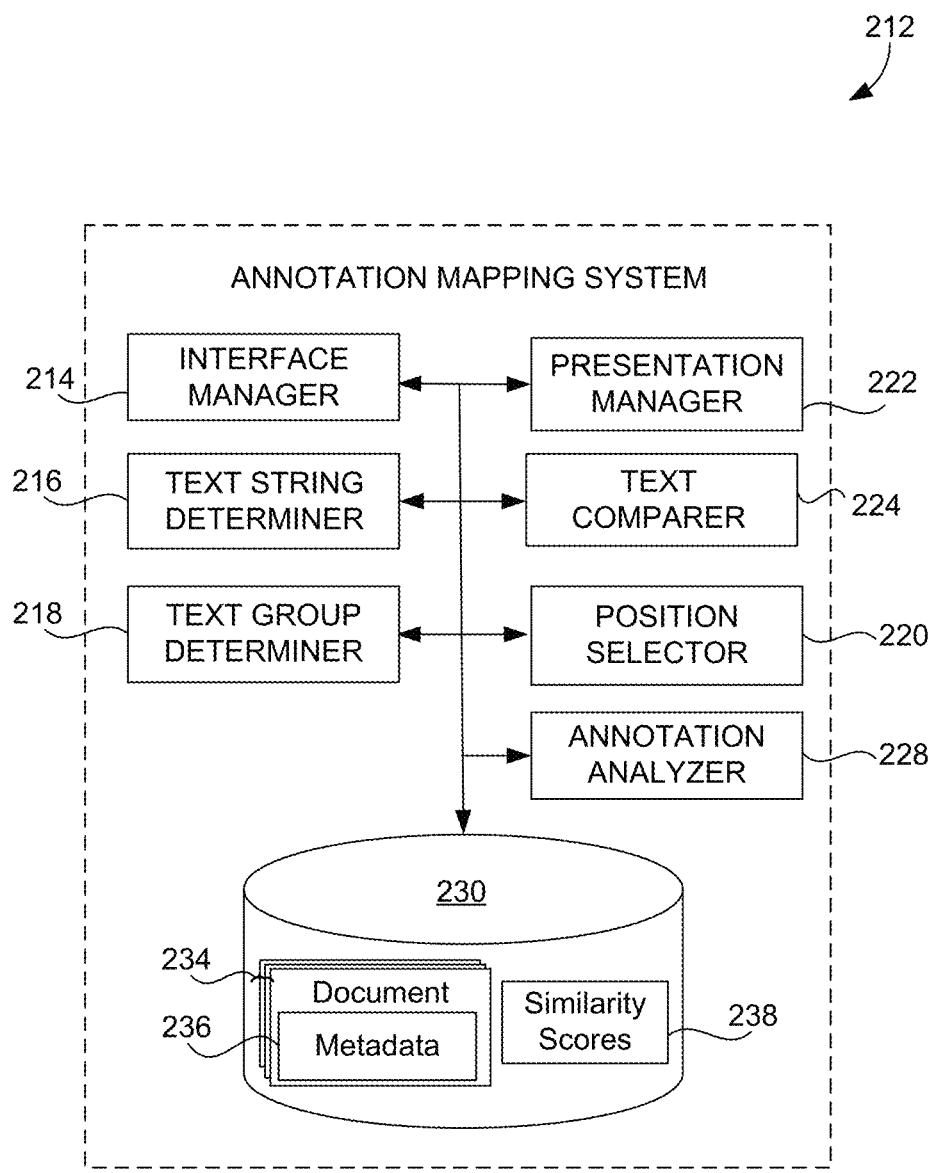
FIG. 2B is an example diagram of an annotation mapping system, in accordance with some embodiments of the present disclosure.

FIG. 2B is an example diagram of the annotation mapping system 212, in accordance with some embodiments of the present disclosure. The annotation mapping system 212 includes an interface manager 214, a text string determiner 216, a text group determiner 218, a position selector 220, a presentation manager 222, a text comparer 224, an annotation analyzer 228, and storage 230.

The storage 230 can comprise computer-readable media and is configured to store computer instructions (e.g., software program instructions, routines, or services), data, and/or models used in embodiments described herein. In some implementations, the storage 230 stores information or data received via and/or generated by the various components of the annotation mapping system 212 and provides the various components with access to that information or data, as needed. In implementations, the storage 230 comprises a data store(s) (or computer data storage). Although depicted as a single component, the storage 230 may be embodied as one or more data stores (e.g., databases) and may be at least partially in the cloud. Some information, such as data objects, may be stored on a user device (e.g., the user device 202A or the user device 202B), and other information may be stored externally (e.g., on a server 208). Thus, it should be appreciated that the information in the storage 230 may be distributed in any suitable manner across one or more data stores for storage (which may be hosted externally).

Among other potential information, the storage 230 includes, as examples, documents 234 and similarity scores 238. One or more of the documents 234 may include or be associated with metadata 236. The documents 234 may comprise, for example, the document 102, the document copy 104, the document copy 106, the modified document 102A, and/or the annotated modified document 102B. Further, the similarity scores 238 may comprise the similarity scores for mapping the annotation 120 and/or the annotation 122 to the modified document 102A to produce the annotated modified document 102B.

As an overview, the interface manager 214 is configured to provide an interface between the annotation mapping system 212 and other entities, such as user devices, users, and/or other systems. The interface manager 214 can receive data indicating a request to map an annotation from a first document (e.g., the document copy 104 or 106) to a second document (e.g., the modified document 102A) (or more generally from a first group of text to a second group of text). The presentation manager 222 is generally responsible for causing presentation of information on one or more user devices and may be used, for example, to provide a GUI (e.g., of the application 210) used to generate the request. In response, the text string determiner 216 may determine a text string (e.g., the text string 130) that corresponds to the annotation (e.g., in the first document). In some embodiments, this includes the text string determiner 216 using the annotation analyzer 228 to analyze the annotation, such as a graphical object(s) corresponding to the annotation. The text group determiner 218 may determine a group of text (e.g., the text group 114A) (e.g., in the second document) in which to attempt to map the annotation. The text comparer 224 may compare the text string to the group of text at different positions in the group of text to determine the similarity scores 238 between the text string and the group of text at the different positions. The position selector 220 may select a position for the annotation in the group of text based on the similarity scores 238 and the annotation may be associated with a range of text (e.g., the range of text 136) in the group of text that corresponds to the position. The presentation manager 222 may cause presentation of the annotation with the range of text (e.g., in the annotated modified document 102B).

As mentioned above, the interface manager 214 is configured to provide an interface between the annotation mapping system 212 and other entities, such as user devices, users, and/or other systems. The interface manager 214 can receive data indicating one or more annotations to be mapped to a group of text. The data can be generated, for example, based on user input to a user device, such as user device 202A (e.g., via the application 210). For example, the user input can correspond to a user selection of an option to import at least one annotation made to a first document into a second document. The user input may be received from a GUI provided using the presentation manager 222. The second document may, for example, be opened and loaded in the application 210 for viewing. Further, the user may select the first document, such as by navigating to the first document in a file explorer (e.g., as part of an annotation importing workflow). Selection of the first document may in some cases automatically designate each annotation made to the first document for importing into the second document, or a user may select one or more particular annotations for importing. Each annotation may be imported in a similar fashion as described herein, or using varying approaches.

The text string determiner 216 may determine a text string that corresponds to an annotation. In some cases, the text string is specified at least partially in the metadata 236 of a document, such as metadata of the annotation. For example, metadata of the annotation may specify the range of text associated with the annotation. The text string determiner 216 may identify the range of text in the metadata and use at least the range of text as the text string. In some embodiments, the text string determiner 216 uses the annotation analyzer 228 to analyze the annotation, such as a graphical object(s) corresponding to the annotation to determine one or more portions of the text string. For example, the metadata of the annotation may not specify the range of text associated with the annotation. Instead, the metadata may specify parameters of the graphical object associated with the annotation.

The annotation analyzer 228 may analyze the graphical object and text associated with the annotation to extract at least the range of text from the text. For example, the annotation analyzer 228 may analyze characters of the text and determine whether to include one or more characters in the range of text based at least in part on positions of the characters of text relative to the annotation. In some embodiments, the annotation analyzer 228 determines a position of a character relative to the annotation. Where the annotation analyzer 228 determines the position of the character satisfies at least one criteria (e.g., by evaluating the position against the criteria) for inclusion in the range of text, the annotation analyzer 228 includes the character in the range of text. In some embodiments, the at least one criteria includes or is based on the position of the character being at least partially within the bounds of the graphical object(s) of the annotation. In some cases, the at least one criteria includes or is based on a centroid of the character being within the bounds of the graphical object(s) of the annotation. For example, the annotation analyzer 228 may identify a centroid of the character and determine whether the centroid is within the bounds of the graphical object(s). Where the centroid is within the bounds (or within a threshold distance from being inside the bounds or otherwise substantially within the bounds), the annotation analyzer 228 may include the character in the range of text. Where the centroid is outside of the bounds (or outside of a threshold distance from being inside the bounds or otherwise substantially outside of the bounds), the annotation analyzer 228 may determine that the character is excluded from the range of text.

Figure 3A:
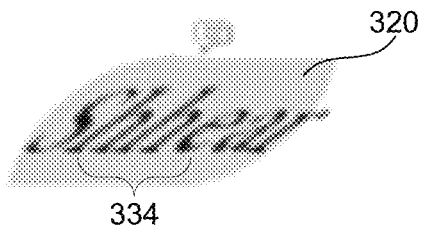
FIG. 3A illustrates an annotation to a range of text, in accordance with some embodiments of the present disclosure.
Figure 3B:
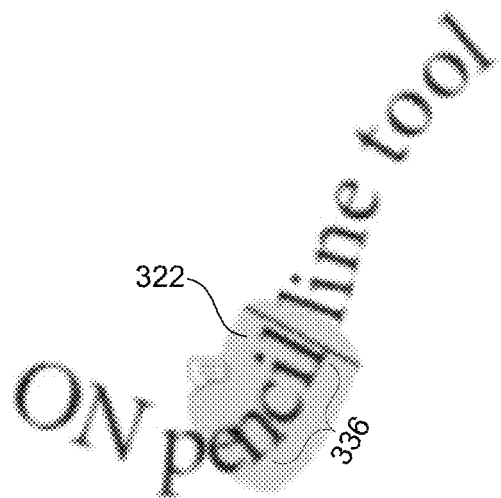
FIG. 3B illustrates an annotation to a range of text, in accordance with some embodiments of the present disclosure.
Figure 3C:
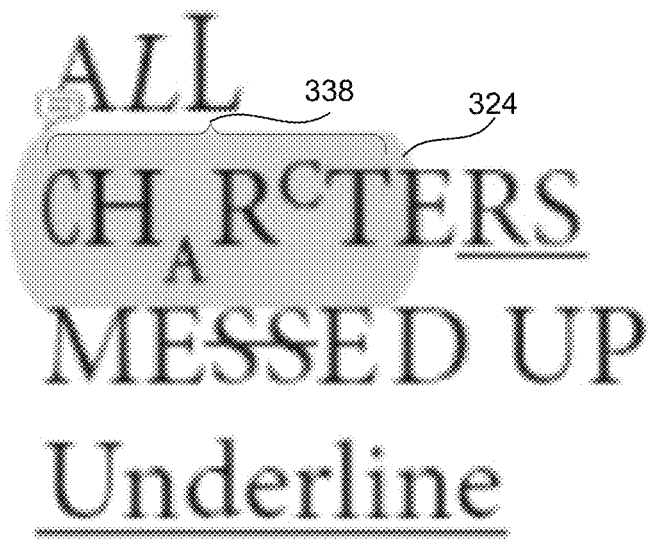
FIG. 3C illustrates an annotation to a range of text, in accordance with some embodiments of the present disclosure.

FIGS. 3A, 3B, and 3C illustrate annotations to ranges of text, in accordance with some embodiments of the present disclosure. The annotation analyzer 228 may be capable of accurately extracting ranges of text 334, 336, and 338 from each of the examples of FIGS. 3A, 3B, and 3C. In particular, the range of text may include the characters selected by a user to generate corresponding annotations without including extra characters, even where those characters may fall at least partially within the bounds of an annotation. The annotation analyzer 228 may include characters in the ranges of text 334, 336, and 338, for example, based on determining centroids of the characters are within the bounds of corresponding annotations, as described above.

An annotation 320, an annotation 322, and an annotation 324 are provided as examples of annotations. By way of example, the annotations 320, 322, and 324 may be included in one or more flat-layout documents, such as a fixed flat-layout document, an example of which is a Portable Document Format (PDF) document.

Each of the annotations 320, 322, and 324 may comprise graphical objects generated, for example, using an annotation tool. For example, to generate the annotation 320, a user viewing a document may select a range of text 334 in the document as input to the annotation tool and the annotation tool may generate the annotation 320 based on the selected text. The other annotations may be generated in a similar manner. The annotation 320, the annotation 322, and the annotation 324 are each shown as highlights to text, but one or more could be other types of annotations, such as those described herein (e.g., underline, strikethrough, etc.).

The annotation analyzer 228 may extract the range of text 334 based on the annotation 320. In this example, the range of text 334 is "hhe," which is identified from "Shhear." Although other characters fall within the bounds of the annotation 320, the annotation analyzer 228 excluded those characters based on positions of those characters failing to satisfy criteria for inclusion in the range of text 334.

The annotation analyzer 228 may extract the range of text 336 based on the annotation 322. In this example, the range of text 336 is "ncil," which is identified from "ON pencil line tool." Although other characters fall within the bounds of the annotation 322, the annotation analyzer 228 excluded those characters based on positions of those characters failing to satisfy criteria for inclusion in the range of text 336.

The annotation analyzer 228 may extract the range of text 338 based on the annotation 324. In this example, the range of text 338 is "charct," which is identified from "ALL CHARACTERS MESSED UP Underline." Although another character fall within the bounds of the annotation 324, the annotation analyzer 228 excluded that character based on position of the character failing to satisfy criteria for inclusion in the range of text 338.

In some embodiments, an annotation comprises one or more quadrilaterals or other graphical objects. The annotation analyzer 228 determines a list of text runs, for example, based on each text run being on a same page as the annotation or otherwise may associate a text run with the annotation. For each text run, the annotation analyzer 228 may extract a bounding box of the text run. Where the bounding box intersects with at least one graphical object of the annotation, the annotation analyzer 228 may analyze characters of the text run for inclusion within a range of text for the annotation. For each character in the text run, the annotation analyzer 228 may analyze the position of the character with respect to the graphical object(s) to determine whether to include the character in the range of text.

Having determined a range of text for an annotation, the text string determiner 216 may include at least the range of text in a text string. In some embodiments, the text string determiner 216 includes at least one additional character in the text string based on the range of text. The at least one additional character may be referred to as a contextual character and may be included in the text string based on a proximity of the character to the range of text in a larger group of text. The at least one additional character may precede and/or follow the range of text in the group of text (e.g., a string). The contextual characters 134A and the contextual characters 134B of FIG. 1B are examples of such characters for the range of text 132. The text string determiner 216 may include each of the contextual characters in the text string 130 based on a respective proximity to the range of text 132. For example, the text string determiner 216 may include a designated number of characters that precede the range of text and/or a designated number of characters that follow the range of text in a text string. By way of example, the designated number could be a predetermined number of characters, such as one-hundred and fifty characters. Additionally or alternatively, the text string determiner 216 may limit contextual characters to those that are within a same text group and/or text frame (or other section) as the range of text. For example, the text string determiner 216 may include a designated number of characters that precede the range of text and/or a designated number of characters that follow the range of text in a text string so long as the characters are in the same section.

A contextual character associated with a range of text may be used, for example, to assist the annotation mapping system 212 in mapping the range of text to a group of text. For example, the group of text may include multiple ranges of text similar to the range of text being mapped. At least one contextual character can be used to distinguish between the similar ranges of text, such that the annotation mapping system 212 is more likely to select the range of text that is most similar to the range of text that was originally annotated. Including the least one contextual character in a text string is one approach to using a contextual character to determine a range of text to map to an annotation. In other approaches, multiple ranges of text could be identified based on associated ones of the similarity scores 238. The annotation mapping system 212 may compare contextual characters associated with the range of text being mapped to a group of text with context characters associated with the identified ranges of text. The annotation mapping system 212 may, based on the comparison, select the range of text for the annotation from the identified ranges of text based on the range of text having the most similar contextual characters.

The text group determiner 218 may determine a group of text in which to attempt to map the annotation using the text string. In some embodiments, the group of text corresponds to all of the text of a document (or group of text) that the annotation is being imported into. In other cases, the text group determiner 218 selects or determines the group of text as a subset of a larger group of text. As an example, the text group determiner 218 may select a text frame and use text of the text frame as the group of text.

In some embodiments, the text group determiner 218 selects the group of text based at least in part on a proximity of the group of text in the document that the annotation is being imported into to a proximity of the range of text, the text string, and/or a group of text or text frame containing the range of text in the annotated document. Where the document has a different coordinate space than the annotated document, the text group determiner 218 may use a transform to compare the relative locations of the text between the documents. In some embodiments, the text group determiner 218 evaluates a group of text (e.g., a text frame) based on determining the group of text falls within a threshold distance (e.g., a geometric distance) of the text of the annotated document (e.g., a text frame). If no group of text falls within the threshold distance, the text group determiner 218 may refrain from importing the annotation based on determining the document is too different from the annotated document. If multiple groups of text fall within the threshold distance, the text group determiner 218 may select a closest of the groups of text for attempting to map the annotation. In some embodiments, where the mapping is unsuccessful, the text group determiner 218 may attempt mapping with another group of text, such as in a order of closest to farthest from the text of the annotated document.

In attempting to map the text string, determined by the text string determiner 216, to the group of text, determined by the text group determiner 218, the text comparer 224 may compare the text string to the group of text at different positions in the group of text to determine the similarity scores 238 between the text string and the group of text at the different positions. In one approach, the text comparer 224 computes the similarity scores 238 as a Levenshtein Distance (LD) between the text string and the group of text for each position of the text string in the group of text. The position selector 220 may select a position for the annotation based on the position having a lowest LD. For example, the annotation may be associated with a range of text in the group of text that corresponds to the position.

In another approach, such as is described with respect to FIGS. 4A and 4B, the text comparer 224 uses a variation of the LD, where the similarity scores 238 between a text string and a group of text at different positions of the text string in the group of text may be captured in a table. In various embodiments, the text comparer 224 calculates an LD for all possible substrings of the text string to all possible substrings of the group of text at each position in the group of text (e.g., at each ending position in the group of text). Using this approach, the text may be read and analyzed in a single pass for processing efficiency. For example, the text comparer 224 may compute a similarity score for a given string that corresponds to the text string from a shorter substring of that string. As an example, a similarity score for "ever" to the group of text may be based on a similarity score for "eve" to the group of text. This may be performed by the text comparer 224 comparing the new character "r" of "ever" to a corresponding character in the group of text. Where the characters match, the similarity score for "eve" may be used as the similarity score for "ever" without having to evaluate each character of "ever." Where the characters do not match, the similarity score may be incremented to increase a cost value similar to a LD. A more detailed example of computing the similarity scores 238 is described below with respect to FIGS. 4A and 4B.

FIGS. 4A and 4B illustrate examples of tables of similarity scores, in accordance with some embodiments of the present disclosure. The text comparer 224 may generate the table 410 of the similarity scores 238 for attempting to map a text string 412 to a group of text 414. In the example of FIG. 4A, the text string 412 is "everyone" and the group of text 414 is "Hello everyone welcome." Similarly, the text comparer 224 may generate the table 420 of the similarity scores 238 for attempting to map a text string 422 to a group of text 424. In the example of FIG. 4B, the text string 412 is "eveyone" and the group of text 414 is "Hello everyone welcome."

In the table 410 and the table 420, "j" may represent the length of the substring of the text string. For example, at (j=1) the text string 412 is "e" and at (j=8) the text string is "everyone." Also in the table 410 and the table 420, "i" may represent an ending position in the group of text 414. For example, at (i=1) the ending position is "H" and at (i=22) the ending position is "e."

In various embodiments, a lower similarity score may generally indicate higher similarity than a higher similarity score. When (i=0), the text comparer 224 may set the similarity score for a cell to 0, as shown in the table 410 and the table 420. When (j=0), the text comparer 224 may set the similarity score for a cell to j, as shown in the table 410 and the table 420. For the remaining cells, the text comparer 224 may compare the character of the text string at the j position to the character of the group of text at the i position in the group of text. When the two characters match, the similarity score for the cell may be set to the similarity score of (i−1, j−1). For example, in the table 410, the text comparer 224 sets the similarity score of (i=9, j=3) to the similarity score of (i=8, j=2) as the matching characters indicate there is no additional cost to add the new character, similar to a LD.

When the two characters do not match, the similarity score for the cell may be set to a similarity score of another cell that is incremented by a cost value to indicate there is an additional cost to add the new character, similar to a LD. In the present example, the text comparer 224 determines the other cell that is used to derive the new similarity score based on analyzing a plurality of cells and selecting the cell that has a minimum similarity score amongst those cells. For example, the text comparer 224 may evaluate the similarity scores of (i−1, j), (i, j−1), and (i−1, j−1) when the characters do not match for the (i, j) cell. The text comparer 224 may use as the similarity score for the (i, j) cell the minimum similarity score of those other cells plus the cost value (e.g., +1). For example, given the table 410 and (i=10, j=2), the base similarity score (e.g., 0) may be from the (i=9, j=1) cell, as that is the minimum score amongst the evaluated cells.

Using this approach, the text comparer 224 may compare the text string to the group of text at the different positions to generate a corresponding table. Other than the default values for the similarity scores, each other similarity score may be determined by the text comparer 224 from a previously determined similarity score without having to evaluate each character of a string for each comparison. Thus, the text comparer 224 may compare the text string to the group of text in a single pass for processing efficiency and speed of analysis.

As indicated above, the position selector 220 may select at least one position for the annotation in the group of text based on the similarity scores 238. In some cases, a position for the annotation may correspond to a character in the group of text. The position selector 220 may select the position based at least in part on one or more of the similarity scores 238 for the position. For example, to select the position, the position selector 220 may evaluate the similarity scores 238 that correspond to the full text string. In the case of the table 410, the similarity scores 238 that are evaluated may be the score in the column (i=8).

The position selector 220 may select the position in the group of text for the annotation that has the minimum similarity score for the string of the text string. In the example of FIG. 4A, the selected position corresponds to (i=14). Based on the selected position, the position selector 220 may select additional positions for the annotation for additional characters of the text string. In FIGS. 4A and 4B, the selected positions for the annotations are indicated using bolded cells.

Where multiple end positions have the same similarity score for the full text string, the position selector 220 may traverse the table for each end position (e.g., backtracking), such as by evaluating the similarity scores 238 for adjacent positions in the group of text to determine a total cost of fitting the annotation to those positions. The position selector 220 may select the end position having a lowest total cost as a position for the annotation.

In embodiments where the text string 412 includes a range of text and at least one contextual character, such as the text string 130, the table may be created with the text string, then the similarity scores may be used to find best fit positions for the range of text. These positions may be determined by backtracking the table, similar to above, starting from the end position of the table, in a manner that is reverse from creating the table. Once the positions are determined, a cost of fitting the range of text for each position is calculated and the minimum is chosen.

Using approaches described herein, the position selector 220 may use the similarity scores 238 to determine one or more regions in the group of text where the total score for the text string is at a minimum. A region in the group of text may refer to a pocket in the group of text. The position selector 220 may select a pocket where the total similarity score is zero, indicating an exact match to the text string, or at a minimum. For each identified pocket of the one or more pockets, a similarity score may be assigned to the pocket based on how well the characters of the pocket match the text string using an LD. Where multiple pockets are evaluated, the position selector 220 may select the pocket with the lowest LD for the annotation. The position selector 220 may associate one or more of the positions of the pocket with the annotation. Optionally, this may include the position selector 220 assigning the position(s) as metadata of the annotation. The metadata may be saved, for example, in the document that the annotation is imported into. Associating the position(s) with the annotation may cause the presentation manager 222 to depict the annotation at each of the associated positions (e.g., in the document).

As mentioned, the position selector 220 may associate one or more of the positions of the pocket with the annotation. In embodiments where the text string includes one or more contextual characters, in addition to the extracted range of text, the position selector 220 may first use the To select the final text, contextual information available while creating 130 is used to find positions in similarity score table 410 to find position where string 132 would be fitted. These positions are determined by backtracking the similarity table 410 starting from the said end position in a way which is exactly the reverse of creating the table. Once these positions are determined, the cost of fitting 132 for each position denoted by the end position of the similarity table 410 is calculated and the minimum is chosen.

Figure 5:
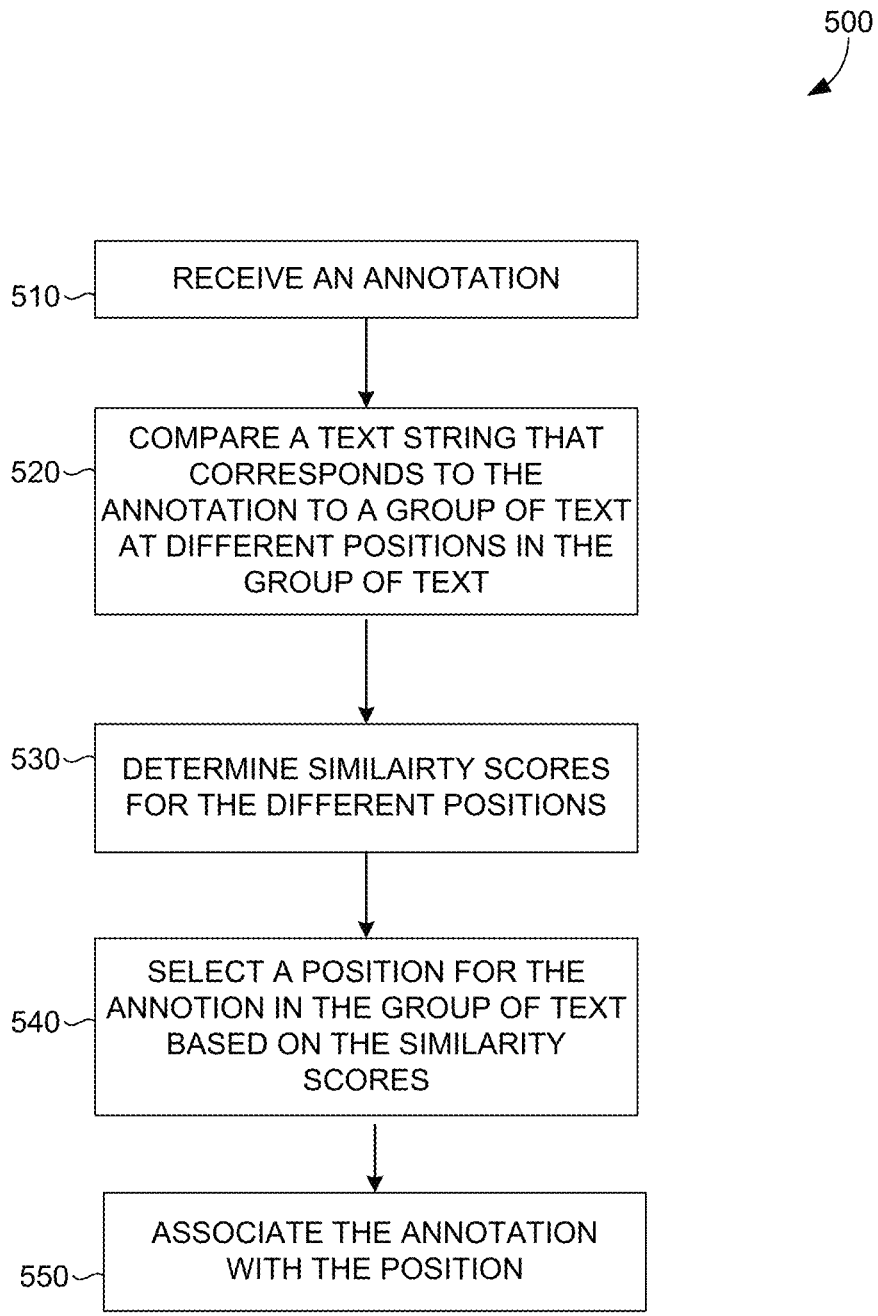
FIG. 5 is a flow diagram showing a method for mapping annotations between groups of text, in accordance with some embodiments of the present invention.

Referring now to FIG. 5, a flow diagram is provided showing an embodiment of a method 500 for mapping annotations. Each block of method 500 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. Method 500 is described with respect to the operating environment 200 and documents of FIGS. 1A and 1B by way of example. However, method 500 may be employed in other operating environments and may more generally apply to groups of texts, as opposed to documents.

At block 510, method 500 includes receiving an annotation. For example, the interface manager 214 may receive the annotation 120 of the range of text 132 of the document copy 104. As an example, the annotation 120 may be received in response to a request to import at least one annotation from the document copy 104 into the modified document 102A.

At block 520, method 500 includes comparing a text string that corresponds to the annotation to a group of text at different positions in the group of text. For example, the text comparer 224 may, based on the annotation 120, perform comparisons between the text string 130 that comprises the range of text 132 and the text group 114A of the modified document 102A at different positions in the text group 114A. The text string 130 may or may not include the contextual characters 134A and 134B. Further, the text string 130 may be determined using the text string determiner 216 and the text group 114A may be determined using the text group determiner 218.

At block 530, method 500 includes determining similarity scores for the different positions. For example, the text comparer 244 may, based on the comparisons, determine the similarity scores 238 between the text string 130 and the text group 114A at the different positions in the text group 114A. The text comparer 244 may, for example, generate the similarity scores 238 using the approach described with respect to FIGS. 4A and 4B.

At block 540, method 500 includes selecting a position for the annotation in the group of text based on the similarity scores. For example, the position selector 220 may select at least one position for the annotation 120A in the text group 114A based on the similarity scores 238 at the different positions. The at least one position may correspond to one or more characters of the range of text 136. For example, the position selector 220 may select the range of text 136 from the text group 114A based on the similarity scores 238.

At block 550, method 500 includes associating the annotation with the position. For example, the position selector 220 may associate the at least one position with the annotation 120A. This may include storing the association, such as in metadata (e.g., that specifies the range of text 136, a corresponding position(s) in the text group 114A, and/or a corresponding geometric position(s) in the modified annotated document 102B) of the annotation 120A and/or displaying the annotation 120A at or based on the at least one position. The presentation manager 222 may be used to display the annotation 120A within the text group 114A, such as on the user device 202A in the application 210.

Figure 6:
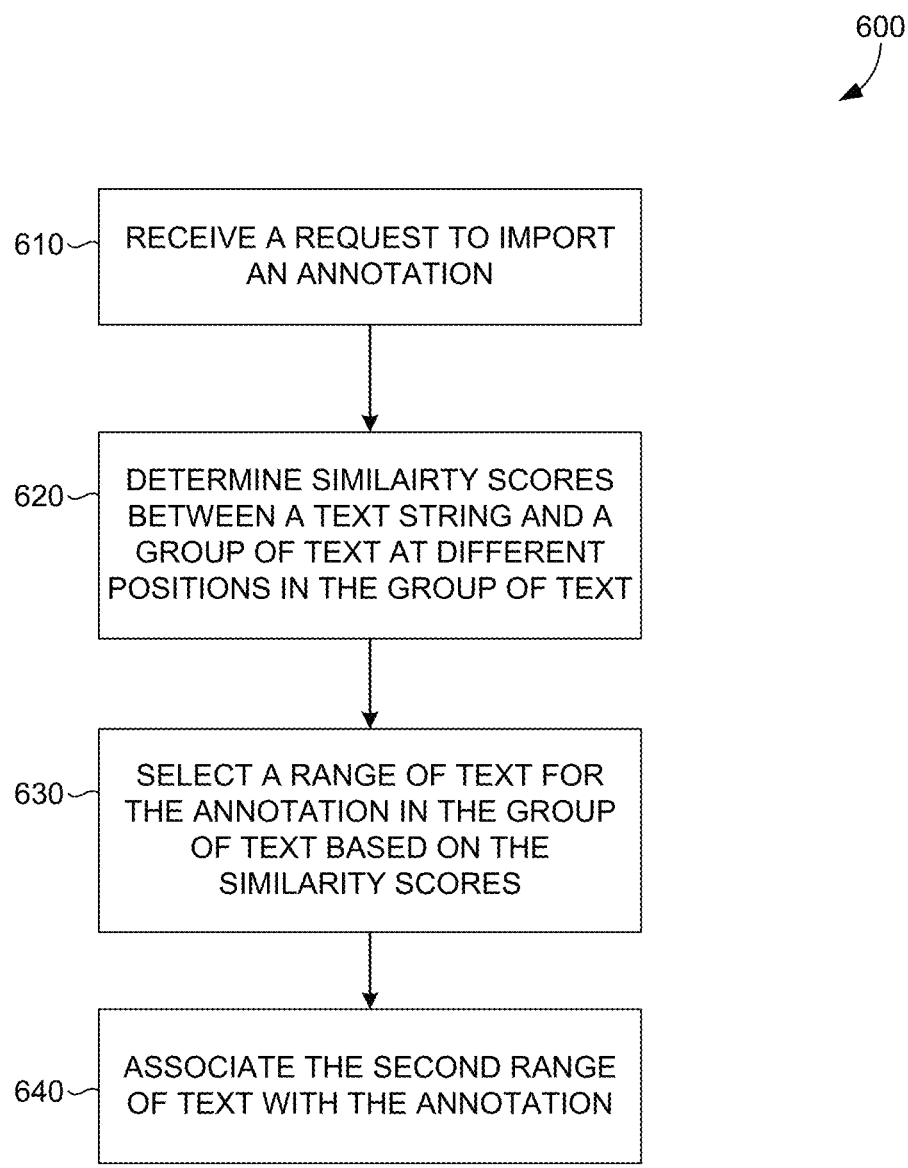
FIG. 6 is a flow diagram showing a method for mapping annotations between groups of text, in accordance with some embodiments of the present invention.

Referring now to FIG. 6, a flow diagram is provided showing an embodiment of a method 600 for mapping annotations.

At block 610, method 600 includes receiving a request to import an annotation. For example, the interface manager 214 may receive a request to import the annotation 120 of the range of text 132 of the text group 114.

At block 620, method 600 includes determining similarity scores between a text string and a group of text at different positions in the group of text. For example, the text comparer 224 may, based at least in part on the request, determine the similarity scores 238 between the text string 130 that comprises the range of text 132 and the text group 114A at different positions in the text group 114A.

At block 630, method 600 includes selecting a range of text for the annotation based on the similarity scores. For example, the position selector 220 may select the range of text 136 for the annotation 120A in the text group 114A based at least in part on the similarity scores 238 at the different positions.

At block 640, method 600 includes associating the second range of text with the annotation. For example, based at least in part on the selecting, the position selector 220 may associate the annotation 120A with the range of text 136.

Figure 7:
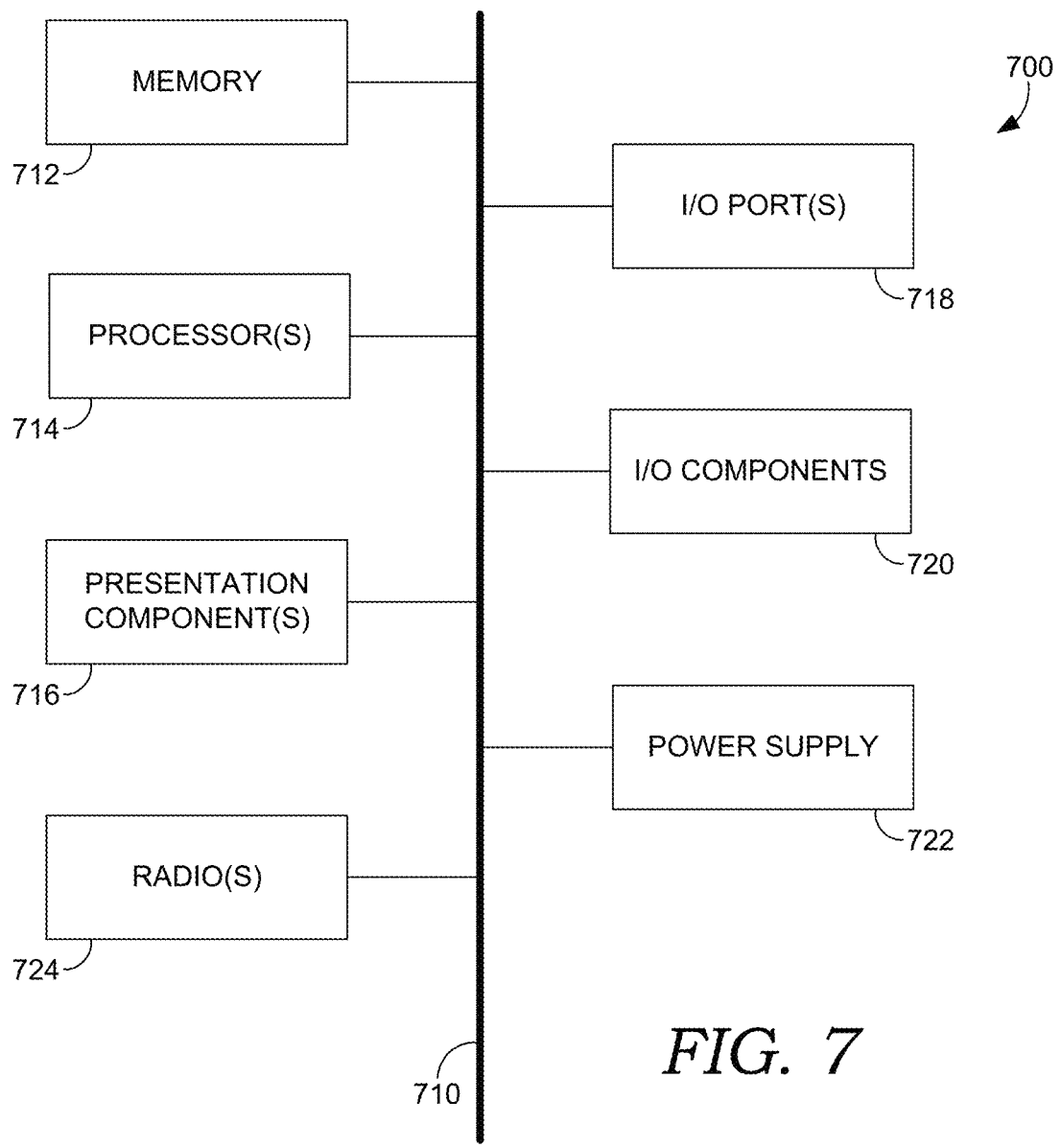
FIG. 7 is a block diagram of an example computing environment suitable for use in implementing some embodiments of the present invention.

With reference to FIG. 7, computing device 700 includes a bus 710 that directly or indirectly couples the following devices: memory 712, one or more processors 714, one or more presentation components 716, input/output (I/O) ports 718, input/output components 720, and an illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 7 is merely illustrative of an example computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer-storage media in the form of volatile and/or nonvolatile memory. The memory may be removable, non-removable, or a combination thereof. Example hardware devices include solid-state memory, hard drives, optical-disc drives, etc. Computing device 700 includes one or more processors that read data from various entities such as memory 712 or I/O components 720. Presentation component(s) 716 present data indications to a user or other device. Example presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc. The I/O components 720 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 700. The computing device 700 may be equipped with depth cameras, such as stereoscopic camera systems, infrared camera systems, RGB camera systems, touchscreen technology, and combinations of these, for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

As can be understood, embodiments of the present invention provide for, among other things, facilitating the mapping of annotations between groups of text. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A computer-implemented method for mapping annotations across groups of text, the method comprising:
  receiving, by at least one processor, an annotation corresponding to a first range of text of a first document;
  comparing, by the at least one processor, for each substring of a text string that comprises the first range of text associated with the annotation, the substring to characters of a group of text of a second document at different positions of the substring in the group of text;
  determining, by the at least one processor, sets of similarity scores, a set of the sets of similarity scores quantifying similarities between characters of the substring and characters of the group of text at the different positions of the substring in the group of text based at least in part on the comparing, wherein a similarity score of the similarity scores corresponds to a position of the different positions;
  selecting, by at least one processor, a position for the annotation within the group of text of the second document based at least in part on a cost of fitting the annotation to the position using an aggregate of similarity scores from a plurality of the sets of similarity scores that correspond to the position and a plurality of substrings of the text string, wherein computing the cost includes adjusting the cost based at least on determining the text string is different than the group of text at the position; and
  associating, by the at least one processor, the annotation with a second range of text in the group of text that corresponds to the selected position.

2. The method of claim 1, further comprising generating the text string that comprises the first range of text, the generating comprising:
  determining a plurality of contextual characters based at least in part on proximities of the contextual characters to the first range of text;
  including the plurality of contextual characters and the first range of text in the text string based at least in part on the determining of the plurality of contextual characters.

3. The method of claim 1, further comprising generating the text string that comprises the first range of text, the generating comprising:
  determining a contextual string based at least in part on a proximity of the contextual string to the first range of text;
  including the contextual string and the first range of text in the text string based at least in part on the determining of the contextual string.

4. The method of claim 1, comprising computing costs of potential positions of the annotation within the group of text, wherein the cost and the position corresponds to the lowest total cost of the costs.

5. The method of claim 1, wherein the adjusting the includes increasing the cost.

6. The method of claim 1, wherein the selecting of the position for the annotation in the group of text is based at least in part on the position having a similarity score that corresponds to a highest degree of similarity with the group of text amongst the different positions.

7. The method of claim 1, wherein the selecting of the position for the annotation in the group of text is based at least in part on a Levenshtein Distance between the first range of text and the second range of text.

8. The method of claim 1, further comprising generating the text string that comprises the first range of text, the generating comprising:
  determining text of the first document intersects with at least one graphical object that forms the annotation;

analyzing one or more characters of the text to determine extents that the at least one graphical object overlaps the one or more characters;

identifying a subset of the one or more characters of the text as belonging to the first range of text based at least in part on the extents for the subset of the one or more characters satisfying at least one condition for inclusion in the first range of text; and adding the subset of the one or more characters to the text string based at least in part on the identifying.

9. The method of claim 1, wherein the set of the sets of similarity scores includes a respective similarity score between each possible substring, of the text string and each possible substring of the group of text at each position in the group of text.

10. The method of claim 1, wherein the first document is a copy of a document comprising text, and the second document is a version of the document that has the text modified.

11. The method of claim 1, further comprising:

comparing a location corresponding to the first range of text in the first document to a location corresponding to the group of text in the second document; and selecting the group of text from a plurality of groups of text of the second document based on the comparing of the location corresponding to the first range of text to the location corresponding to the group of text.

12. One or more non-transitory computer storage media storing computer-useable instructions that, when used by one or more processors, cause the one or more processors to perform operations comprising:

receiving a request to import an annotation corresponding to a first range of text of a first group of text into a second group of text;

determining sets of similarity scores for substrings of the first range of text, a set of the sets of similarity scores for a substring of the substrings quantifying similarities between characters of the substring and characters of the second group of text at different positions of the substring in the second group of text, wherein a similarity score of the similarity scores corresponds to a position of the different positions;

selecting a second range of text as the annotation within the second group of text based at least in part on a total cost of fitting the second range of text to positions occupied by the second range of text, the total cost computed from similarity scores from a plurality of the sets of similarity scores that correspond to the positions of a plurality of the substrings, wherein computing the total cost includes adjusting the total cost based at least on determining the first range of text is different than the second range of text at a position of the positions; and associating, by the at least one processor, the annotation with the second range of text.

13. The computer storage media of claim 12, wherein the operations further comprise:

identifying at least one character based at least in part on a proximity of the at least one character to the first range of text in the first group of text; and incorporating the at least one character and the first range of text into the text string based at least in part on identifying.

14. The computer storage media of claim 12, wherein the first group of text is of a first document and the second group of text is of a second document.

15. The computer storage media of claim 12, wherein each substring of the substrings of the set has a respective similarity score for each of the different positions of the substring.

16. A computer-implemented system comprising:

at least one processor;

an interface manager, executed by the at least one processor, for receiving an annotation corresponding to a first range of text;

a text comparer, executed by the at least one processor, for determining sets of similarity scores for substrings of a text string that comprises the first range of text, a set of the sets of similarity scores for a substring of the substrings being between characters of the substring and characters of a group of text at different positions of the substring in the group of text, wherein a similarity score of the similarity scores corresponds to a position of the different positions; and a position selector, executed by the at least one processor, for selecting a position for the annotation within the group of text based at least in part on a cost computed from an aggregate of similarity scores from a plurality of the sets of similarity scores that corresponds to the position and a plurality of the substrings, and for associating the annotation with a second range of text in the group of text that corresponds to the position, wherein computing the cost includes adjusting the cost based at least on determining the text string is different than the group of text at the position.

17. The computer-implemented system of claim 16, wherein the determining the sets of similarity scores comprises generating a table comprising the sets of similarity scores, wherein a first axis of the table represents the substrings and a second axis of the table represents the different positions of the substrings within the group of text.

18. The computer-implemented system of claim 16, further comprising a text group determiner for selecting the group of text based at least in part on a location of the first range of text in a document.

19. The computer-implemented system of claim 16, further comprising an annotation analyzer for extracting the first range of text from a larger range of text.

20. The computer-implemented system of claim 16, wherein each substring of the substrings of the set has a respective similarity score for each of the different positions of the substring.

* * * * *